US011480527B2

(12) United States Patent
Jiang et al.

(10) Patent No.: US 11,480,527 B2
(45) Date of Patent: Oct. 25, 2022

(54) METHODS AND SENSORS FOR DETECTION

(71) Applicant: University of Florida Research Foundation, Inc., Gainesville, FL (US)

(72) Inventors: Peng Jiang, Gainesville, FL (US); Zhuxiao Gu, Gainesville, FL (US); Sin-Yen Leo, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 231 days.

(21) Appl. No.: 16/765,132

(22) PCT Filed: Dec. 19, 2018

(86) PCT No.: PCT/US2018/066353
§ 371 (c)(1),
(2) Date: May 18, 2020

(87) PCT Pub. No.: WO2019/126248
PCT Pub. Date: Jun. 27, 2019

(65) Prior Publication Data
US 2020/0348239 A1 Nov. 5, 2020

Related U.S. Application Data

(60) Provisional application No. 62/607,975, filed on Dec. 20, 2017.

(51) Int. Cl.
*G01N 21/78* (2006.01)
(52) U.S. Cl.
CPC .................. *G01N 21/78* (2013.01)

(58) Field of Classification Search
CPC ..................................................... G01N 21/78
See application file for complete search history.

(56) References Cited

U.S. PATENT DOCUMENTS

| | | | |
|---|---|---|---|
| 3,422,535 A | 1/1969 | Johnson | |
| 3,671,105 A | 6/1972 | Williams et al. | |
| 4,125,319 A | 11/1978 | Frank et al. | |

(Continued)

FOREIGN PATENT DOCUMENTS

| | | |
|---|---|---|
| CN | 103935057 A | 7/2014 |
| CN | 105036068 A | 11/2015 |

(Continued)

OTHER PUBLICATIONS

E. Metwalli, D.; et al. "Surface characterizations of mono-, di-, and tri-, aminosilane treated glass substrates", J. Colloid Interf. Sci. 298 (2006) 825-831.

(Continued)

*Primary Examiner* — Brian R Gordon
*Assistant Examiner* — Dwan A Gerido
(74) *Attorney, Agent, or Firm* — Thomas|Horstemeyer, LLP

(57) ABSTRACT

Described are chromogenic sensors, methods of use, and kits including sensors. The sensors can have a polymer structure with a waveform cross-section in a programmed state. Upon exposure to a first liquid, the polymer structure in the programmed state changes to polymer structure in an activated state. Methods for measuring the presence of a liquid using the sensor are described, as are kits including the sensors.

11 Claims, 7 Drawing Sheets

(56) References Cited

U.S. PATENT DOCUMENTS

| | | |
|---|---|---|
| 4,340,479 A | 7/1982 | Pall |
| 4,664,748 A | 5/1987 | Ueno et al. |
| 4,781,441 A | 11/1988 | Kanbe et al. |
| 4,810,633 A | 3/1989 | Bauer et al. |
| 5,147,716 A | 9/1992 | Bellus |
| 5,337,018 A | 8/1994 | Yamagishi |
| 5,429,743 A | 7/1995 | Geus et al. |
| 5,529,524 A | 6/1996 | Jones |
| 5,641,332 A | 6/1997 | Faber et al. |
| 5,753,014 A | 5/1998 | Van Rijn |
| 5,939,189 A | 8/1999 | Phillips et al. |
| 5,948,470 A | 9/1999 | Harrison et al. |
| 5,993,661 A | 11/1999 | Ruckenstein et al. |
| 6,044,981 A | 4/2000 | Chu et al. |
| 6,531,304 B1 | 3/2003 | Boennemann et al. |
| 6,565,763 B1 | 5/2003 | Asakawa et al. |
| 6,649,255 B1 | 11/2003 | Fain et al. |
| 6,881,582 B2 | 4/2005 | Ratogi et al. |
| 6,929,764 B2 | 8/2005 | Jiang et al. |
| 6,958,137 B2 | 10/2005 | Lee et al. |
| 7,351,470 B2 | 4/2008 | Draheim et al. |
| 7,630,589 B2 | 12/2009 | Kilic et al. |
| 7,691,325 B2 | 4/2010 | Chopra et al. |
| 7,889,954 B2 | 2/2011 | Sailor et al. |
| 9,233,883 B1 | 1/2016 | Rauscher et al. |
| 9,272,947 B2 | 3/2016 | Baca et al. |
| 10,189,967 B2 | 1/2019 | Jiang et al. |
| 10,700,225 B2 | 6/2020 | Wang et al. |
| 2003/0031438 A1 | 2/2003 | Kambe et al. |
| 2004/0131779 A1 | 7/2004 | Haubrich et al. |
| 2004/0131799 A1 | 7/2004 | Arsenault et al. |
| 2004/0184948 A1 | 9/2004 | Rakow et al. |
| 2005/0132543 A1* | 6/2005 | Lindsay ............... B24D 11/001 24/442 |
| 2005/0147807 A1 | 7/2005 | Haas et al. |
| 2006/0137462 A1 | 6/2006 | Divigalpitiya et al. |
| 2007/0036653 A1 | 2/2007 | Bak et al. |
| 2007/0156079 A1 | 7/2007 | Brown |
| 2007/0206270 A1 | 9/2007 | Iwamatsu et al. |
| 2008/0006574 A1 | 1/2008 | Ramaswamy et al. |
| 2008/0027199 A1 | 1/2008 | Mazurek et al. |
| 2008/0108142 A1 | 5/2008 | Hall et al. |
| 2008/0185498 A1 | 8/2008 | Purdy et al. |
| 2008/0233418 A1 | 9/2008 | Krueger |
| 2008/0309923 A1 | 12/2008 | Falk |
| 2009/0034051 A1 | 2/2009 | Arsenault et al. |
| 2009/0274873 A1 | 11/2009 | Shinotsuka |
| 2010/0051561 A1 | 3/2010 | Lee |
| 2010/0058844 A1 | 3/2010 | Lin et al. |
| 2010/0068168 A1 | 3/2010 | Song et al. |
| 2010/0069726 A1 | 3/2010 | Levinson |
| 2010/0125113 A1 | 5/2010 | Xiao et al. |
| 2010/0150511 A1 | 6/2010 | Arsenault et al. |
| 2010/0155325 A1 | 6/2010 | Zhang et al. |
| 2010/0188732 A1 | 7/2010 | Akashi et al. |
| 2010/0216310 A1 | 8/2010 | Metz et al. |
| 2010/0218716 A1 | 9/2010 | Havens et al. |
| 2010/0235107 A1 | 9/2010 | Fukumura et al. |
| 2010/0244169 A1 | 9/2010 | Maeda et al. |
| 2010/0315703 A1 | 12/2010 | Purdy et al. |
| 2011/0019277 A1 | 1/2011 | Sager et al. |
| 2011/0097814 A1 | 4/2011 | Bommarito et al. |
| 2011/0111173 A1 | 5/2011 | Ogawa et al. |
| 2011/0140106 A1 | 6/2011 | Forbes |
| 2011/0194261 A1 | 8/2011 | Tanaka et al. |
| 2011/0233476 A1 | 9/2011 | Arsenault |
| 2011/0255035 A1 | 10/2011 | Wu |
| 2012/0051489 A1 | 3/2012 | Varanasi et al. |
| 2012/0073388 A1 | 3/2012 | Chibante |
| 2012/0074612 A1 | 3/2012 | Scrivens et al. |
| 2012/0152338 A1 | 6/2012 | Ha et al. |
| 2012/0225517 A1 | 9/2012 | Zhang et al. |
| 2012/0262789 A1 | 10/2012 | Xie et al. |
| 2012/0281292 A1 | 11/2012 | Baca et al. |
| 2012/0293802 A1 | 11/2012 | Ozin et al. |
| 2012/0313205 A1 | 12/2012 | Haddad et al. |
| 2012/0321810 A1 | 12/2012 | Tebby et al. |
| 2013/0078750 A1 | 3/2013 | Yeo et al. |
| 2013/0199995 A1 | 8/2013 | Jiang et al. |
| 2013/0215513 A1 | 8/2013 | Liang et al. |
| 2013/0222881 A1 | 8/2013 | Aizenberg et al. |
| 2013/0258483 A1 | 10/2013 | Pett et al. |
| 2013/0320467 A1 | 12/2013 | Buchanan et al. |
| 2013/0340824 A1 | 12/2013 | Oh et al. |
| 2014/0017145 A1 | 1/2014 | Aizenberg et al. |
| 2014/0106468 A1 | 4/2014 | Boersma |
| 2014/0166100 A1 | 6/2014 | Watanabe et al. |
| 2014/0319524 A1 | 10/2014 | Phillips et al. |
| 2015/0035269 A1 | 2/2015 | Hooper et al. |
| 2015/0157453 A1 | 6/2015 | Nazirizadeh et al. |
| 2015/0276989 A1 | 10/2015 | Han et al. |
| 2015/0308961 A1* | 10/2015 | Burg ...................... G01N 21/78 382/165 |
| 2016/0032141 A1 | 2/2016 | Maghsoodi et al. |
| 2016/0254395 A1 | 9/2016 | Jiang et al. |
| 2016/0326334 A1* | 11/2016 | Jiang ..................... G02B 1/005 |
| 2017/0038295 A1* | 2/2017 | Aizenberg ........... G01N 21/251 |
| 2017/0209045 A1 | 7/2017 | Choo et al. |
| 2017/0215790 A1 | 8/2017 | Levinson et al. |
| 2017/0225395 A1 | 8/2017 | Boydston et al. |
| 2017/0271259 A1 | 9/2017 | Hotta et al. |

FOREIGN PATENT DOCUMENTS

| | | |
|---|---|---|
| EP | 0341675 A2 | 11/1989 |
| EP | 2220520 A2 | 8/2010 |
| WO | 9820388 A1 | 5/1998 |
| WO | 1998020388 A1 | 5/1998 |
| WO | 2000010934 A1 | 3/2000 |
| WO | 02073699 A3 | 11/2002 |
| WO | 2007070486 A2 | 6/2007 |
| WO | 2008060322 A2 | 5/2008 |
| WO | 2010007853 A1 | 1/2010 |
| WO | 2015066337 A1 | 5/2015 |
| WO | 2018213570 A2 | 11/2018 |

OTHER PUBLICATIONS

Esquivel-Upshaw, J. F., et al. "Surface degradation of dental ceramics as a function of environmental pH." Journal of dental research 92.5 (2013): 467-471.

Esquivel-Upshaw, Josephine F., et al. "In Vivo Wear of Enamel by a Lithia Disilicate—Based Core Ceramic Used for Posterior Fixed Partial Dentures: First-Year Results." International Journal of Prosthodontics 19.4 (2006).

Esquivel-Upshaw, Josephine F., et al. "Resistance to staining, flexural strength, and chemical solubility of core porcelains for all-ceramic crowns." International Journal of Prosthodontics 14.3 (2001).

Esquivel-Upshaw, Josephine, et al. "Randomized, controlled clinical trial of bilayer ceramic and metal-ceramic crown performance." Journal of Prosthodontics: Implant, Esthetic and Reconstructive Dentistry 22.3 (2013): 166-173.

Fang et al., "Reconfigurable photonic crystals enabled by pressure-responsive shape-memory polymers", Nature Communications 2015: 1-8.

Fang, Y.; et al. Chromogenic Photonic Crystals Enabled by Novel Vapor-Responsive Shape Memory Polymers. Adv. Mater. 2015, 27, 3696-3704.

Fang, Y.; et al. Reconfigurable Photonic Crystals Enabled by Multistimuli-Responsive Shape Memory Polymers Possessing Room Temperature Shape Processability ACS Appl. Mater. Interfaces 2017, 9, 5457-5467.

Felton et al., Soft Matter "Self-folding with shape memory composites", Soft Matter, 2013, 9, 7688-7694.

Fenzl et al., "Photonic Crystals for Chemical Sensing and Biosensing", Angewandte Chemie Ed. 2015, 53: 3318-3335.

Fischer, H.; et al. "Effect of surface roughness on flexural strength of veneer ceramics." Journal of Dental Research 82.12 (2003): 972-975.

(56) References Cited

OTHER PUBLICATIONS

Flannery, Anthony F., et al. "PECVD silicon carbide as a chemically resistant material for micromachined transducers." Sensors and Actuators A: Physical 70.1-2 (1998): 48-55.
Fu, Q. Q.; et al. Hierarchically Structured Photonic Crystals for Integrated Chemical Separation and Colorimetric Detection Nanoscale 2017, 9, 2457-2463.
Fudouzi et al., "Colloidal Crystals with Tunable Colors and Their Use as Photonic Papers", Langmuir 2003, 19: 9653-9660.
G. Zhou, J. He, J. "Antireflective coatings on Fresnel lenses by spin-coating of solid silica nanoparticles", Nanosci. Nanotechnol. 13 (2013) Abstract.
G.M. Nogueira, D. Banerjee, R.E. Cohen, M.F. Rubner, "Spray-Layer-by-Layer Assembly Can More Rapidly Produce Optical-Quality Multistack Heterostructures", Langmuir 27 (2011) 7860-7867.
Ge et al., "Highly Tunable Superparamagnetic Colloidal Photonic Crystals", Angew. Chem. Int. Ed. 2007, 46: 7428-7431.
Ge et al., "Rewritable Photonic Paper with Hygroscopic Salt Solution as Ink", Advanced Materials 2009, 21: 4259-1264.
Ge, J. P.; et al. Responsive Photonic Crystals. Angew. Chem. Int. Ed. 2011, 50, 1492-1522.
Gemici et al., "Targeted Functionalization of Nanoparticle Thin Films via Capillary Condensation", Nano Letters 2009, 9, 3: 1064-1070.
Gourevich, I.; et al. Nanostructured Material for Optical Data Storage and Security Labeling. Chem. Mater. 2004, 16, 1471-1479.
Gourevich, Ilya, et al. "Multidye nanostructured material for optical data storage and security labeling." Chemistry of materials 16.8 (2004): 1472-1479.
Zhao, Q.; et al. Shape Memory Polymer Network with Thermally Distinct Elasticity and Plasticity. Sci. Adv. 2016, 2, e1501297.
Grigoras et al., Fabrication of porous membrane filter from p-type silicon, Physica Status Solidi (a) 202(8): 1624-1628.
Gu et al., "Water-triggered shape memory of multiblock thermoplastic polyurethanes (TPUs)", RSC Adv. 2013, 3: 15783-15791.
Gugliuzza et al., "A review on membrane engineering for innovation in wearable fabrics and protective textiles", Journal of Membrane Science 446(2013): 350-375.
H. Fudouzi, M. Kobayashi, N. Shinya, "Assembly of Microsized Colloidal Particles on Electrostatic Regions Patterned through Ion Beam Irradiation", Langmuir 18 (2002) 7648-7652.
H. Jiang, K. Yu, Y.C. Wang, "Antireflective structures via spin casting of polymer latex", Opt. Lett. 32 (2007) 575-577.
H. Nagel, A. Metz, R. Hezel, "Porous SiO2 films prepared by remote plasma-enhanced chemical vapour deposition—a novel antireflection coating technology for photovoltaic modules", Sol. Energ. Mater. Sol. C. 65 (2001) 71-77.
H. Shimomura, Z. Gemici, R.E. Cohen, M.F. Rubner, "Layer-by-Layer-Assembled High-Performance Broadband Antireflection Coatings", ACS Appl. Mater. Interface 2 (2010) 813-820.
Zhao, Q.; et al. Recent Progress in Shape Memory Polymer: New Behavior, Enabling Materials, and Mechanistic Understanding. Prog. Polym. Sci 2015, 49-50, 79-120.
H.Y. Koo, D.K. Yi, S.J. Yoo, D.Y. Kim, "A Snowman-like Array of Colloidal Dimers for Antireflecting Surfaces", Adv. Mater. 16 (2004) 274-277.
Habault et al., "Light-triggered self-healing and shape-memory polymers", Chem. Soc. Rev. 2013, 42: 7244-7256.
Han et al., "Full Color Tunable Photonic Crystal from Crystalline Colloidal Arrays with an Engineered Photonic Stop-Band", Adv. Mater. 2012, 24,: 6438-6444.
Han, H; et al. "Metal-assisted chemical etching of silicon and nanotechnology applications" ScienceDirect 2014, 9, 271-304.
Zhang, Haixia, et al. "Application of PECVD SiC in glass micromachining." Journal of Micromechanics and Microengineering 17.4 (2007): 775.
Zhang, G. G.; et al. Unusual Aspects of Supramolecular Networks: Plasticity to Elasticity, Ultrasoft Shape Memory, and Dynamic Mechanical Properties. Adv. Funct. Mater. 2016, 26, 931-937.
Hatton et al., "Assembly of large-area, highly ordered, crack-free inverse opal films", PNAS 2010, vol. 107, 23: 10354-10359.
Heintze, Siegward D; et al. "Survival of zirconia-and metal-supported fixed dental prostheses: a systematic review." International Journal of Prosthodontics 23.6 (2010).
Heo, Y.; et al. Controlled Insertion of Planar Defect in Inverse Opals for Anticounterfeiting Applications. ACS Appl. Mater. Interfaces 2017, 9, 43098-43104.
Heo, Y.; et al. Lithographically Encrypted Inverse Opals for Anti-Counterfeiting Applications. Small 2016,12, 3819-3826.
Herrmann, M. "Corrosion of silicon nitride materials in aqueous solutions." Journal of the American Ceramic Society 96.10 (2013): 3009-3022.
Herrmann, M., et al. "Corrosion of silicon nitride materials in acidic and basic solutions and under hydrothermal conditions." Journal of the European Ceramic Society 23.4 (2003): 585-594.
Heuwers et al., "Shape-Memory Natural Rubber: An Exceptional Material for Strain and Energy Storage", Macromolecular Chemistry and Physics 2013, 214: 912-923.
Heuwers et al., "Stress-Induced Stabilization of Crystals in Shape Memory Natural Rubber", Macromolecular Rapid Communications 2013, 34: 180-184.
Holtz et al., "Polymerized colloidal crystal hydrogel films as intelligent chemical sensing materials", Nature 1997, 389: 829-832.
Hou, J.; et al. Four-Dimensional Screening Anti-Counterfeiting Pattern by Inkjet Printed Photonic Crystals. Chem.—An Asian J. 2016, 11, 2680-2685.
Hu, H. B.; et al. Magnetically Responsive Photonic Watermarks on Banknotes. J. Mater. Chem. C 2014, 2, 3695-3702.
Hu, H.; et al. Photonic Anti-Counterfeiting Using Structural Colors Derived from Magnetic-Responsive Photonic Crystals with Double Photonic Bandgap Heterostructures J. Mater. Chem. 2012, 22, 11048-11053.
Huang et al., "Water-driven programmable polyurethane shape memory polymer: Demonstration and mechanism", Applied Physics Letters 2005, 86: 1-3.
S. Degand, G. Lamblin, C.C. Dupont-Gillain, "Colloidal lithography using silica particles: Improved particle distribution and tunable wetting properties", J. Colloid Interf. Sci. 392 (2013) 219-225.
S. Lu,; et al. "Receptor-Ligand-Based Specific Cell Adhesion on Solid Surfaces: Hippocampal Neuronal Cells on Bilinker Functionalized Glass" Nano Lett. 6 (2006) 1977-1981.
S. Walheim, E. Schäffer, J. Mlynek, U. Steiner, "Nanophase-Separated Polymer Films as High-Performance Antireflection Coatings", Science 283 (1999) 520-522.
S.P. Pack, et al. "Direct immobilization of DNA oligomers onto the amine-functionalized glass surface for DNA microarray fabrication through the activation-free reaction of oxanine", Nucleic Acids Res. 35 (2007), 10 pages.
Sailer, Irena, et al. "A systematic review of the survival and complication rates of all-ceramic and metal-ceramic reconstructions after an observation period of at least 3 years. Part II: fixed dental prostheses." Clinical oral implants research 18 (2007): 86-96.
Salido, María P., et al. "Prospective clinical study of zirconia-based posterior four-unit fixed dental prostheses: four-year follow-up" International Journal of Prosthodontics 25.4 (2012).
Schäfer et al., "Fully Reversible Shape Transition of Soft Spheres in Elastomeric Polymer Opal Films", Langmuir 2013, 29: 11275-11283.
Schäfer et al., "Reversible Light-, Thermo-, and Mechano-Responsive Elastomeric Polymer Opal Films", Chemistry of Materials 2013, 25: 2309-2318.
Schauer, S.; et al. Tunable Diffractive Optical Elements Based on Shape-Memory Polymers Fabricated via Hot Embossing. ACS Appl. Mater. Interfaces 2016, 8, 9423-9430.
Schneider, Friedrich. "The financial flows of transnational crime and tax fraud in OECD countries: What do we (not) know?." Public Finance Review 41.5 (2013): 677-707.
Scurria, Mark S.; et al. "Meta-analysis of fixed partial denture survival: prostheses and abutments." The Journal of prosthetic dentistry 79.4 (1998): 459-464.

(56) References Cited

OTHER PUBLICATIONS

Shang, S. L.; et al. Fabrication of Magnetic Field Induced Structural Colored Films with Tunable Colors and Its Application on Security Materials. J. Colloid Interface Sci. 2017, 485, 18-24.
Small IV, et al., "Laser-activated shape memory polymer intravascular thrombectomy device", Optics Express 2005, 13: 8204-8213.
Stöber, W.; et al. Controlled Growth of Monodisperse Silica Spheres in Micron Size Range. J. Colloid Interface Sci. 1968, 26, 62-69.
Stojilovic, N., Why Can't We See Hydrogen in X-Ray Photoelectron Spectroscopy? J. Chem. Edu. 2012, 89, 1331-1332.
Stuart et al., "Emerging applications of stimuli-responsive polymer materials", Nature Materials 2010, 9: 101-113.
Sun; et al. "Broadband moth-eye antireflection coatings on silicon" Applied Physics Letters; Feb. 14, 2008, vol. 92, pp. 061112 (1)-(3).
T. Lohmueller, M. Helgert, M. Sundermann, R. Brunner, J.P. Spatz, "Biomimetic Interfaces for High-Performance Optics in the Deep-UV Light Range", Nano Lett. 8 (2008) 1429-1433.
T. Xie, "Recent advances in polymer shape memory", Polymer 2011, 52: 4985-5000.
Takeoka et al., "Polymer Gels that Memorize Structures of Mesoscopically Sized Templates. Dynamic and Optical Nature of Periodic Ordered Mesoporous Chemical Gels", Langmuir 2002, 18: 5977-5980.
Tobushi et al., "Thermomechanical properties in a thin film of shape memory polymer of polyurethane series", Smart Mater. Struct. (1996) 5: 483-491.
Toor, F; et al. "Nanostructured silicon via metal assisted catalyzed etch (MACE): chemistry fundamentals and pattern engineering" Nanotechnology 2016, 27, 412003.
Tsai et al., "Retainment of pore connectivity in membranes prepared with vapor-induced phase separation", Journal of Membrane Science 2010, 362: 360-373.
U. Schulz, "Review of modern techniques to generate antireflective propoerties on thermoplastic polymers", Appl. Opt. 45 (2006) 1608-1618.
Yue et al., "Lamellar Hydrogels with High Toughness and Ternary Tunable Photonic Stop-Band", Advanced Materials 2013, 25: 3106-3110.
Yue et al., "Mechano-actuated ultrafast full-colour switching in layered photonic hydrogels", nature communications 2014: 1-8.
Velev et al., "Porous silica via colloidal crystallization", Nature 1997, 389: 447-448.
Vlasov, Y. A.; et al. On-Chip Natural Assembly of Silicon Photonic Bandgap Crystals. Nature 2001, 414, 289-293.
W.L. Min, B. Jiang, P. Jiang, "Bioinspired Self-Cleaning Antireflection Coatings", Adv. Mater. 20 (2008) 3914-3918.
Wang, M. S.; et al. Magnetically Responsive Nanostructures with Tunable Optical Properties. J. Am. Chem. Soc. 2016, 138, 6315-6323.
Wang, Zhen, et al. "Programmable, pattern-memorizing polymer surface." Advanced Materials 23.32 (2011): 3669-3673.
Weissman et al., "Thermally Switchable Periodicities and Diffraction from Mesoscopically Ordered Materials", Science 1996, 274: 959-960.
Witt, Kendhl Kate. "Optical Sensors for the Analysis of Alcohols in Fuels." (2016).
Woo et al., Preparation and characterization of three dimensionally ordered macroporous Li4Ti5O12 anode for lithium batteries. Electrochimica Acta 2007, 53(1): 79-82.
Yang, D. P.; et al. Polymerization-Induced Colloidal Assembly and Photonic Crystal Multilayer for Coding and Decoding. Adv. Funct. Mater. 2014, 24, 817-825.
Wu, S. L.; et al. Structural Color Patterns on Paper Fabricated by Inkjet Printer and Their Application in Anticounterfeiting. J. Phys. Chem. Lett. 2017, 8, 2835-2841.
X. Li, O. Niitsoo, A. Couzis, "Electrostatically driven adsorption of silica nanoparticles on functionalized surfaces", J. Colloid Interf. Sci. 394 (2013) 26-35.
X. Li, O. Niitsoo, A. Couzis, "Experimental studies on irreversibility of electrostatic adsorption of silica nanoparticles at solid-liquid interface", J. Colloid Interf. Sci. 420 (2014) 50-56.
X.T. Zhang, O. Sato, M. Taguchi, Y. Einaga, T. Murakami, A. Fujishima, "Self-Cleaning Particle Coating with Antireflection Properties", Chem. Mater. 17 (2005) 696-700.
Xie et al., "Encoding Localized Strain History Through Wrinkle Based Structural Colors", Advanced Materials 2010, 22: 4390-4394.
Xu et al., "Deformable, Programmable, and Shape-Memorizing Micro-Optics", Advanced Functional Materials 2013, 23: 3299-3306.
Xue et al., "Synthesis and characterization of elastic star shape-memory polymers as self-expandable drug-eluting stents", Journal of Materials Chemistry 2012, 22: 7403-7411.
Y. Masuda, M. Itoh, T. Yonezawa, K. Koumoto, "Low-Dimensional Arrangement of SiO2 Particles", Langmuir 18 (200) 4155-4159.
Y. Zhao, J.S. Wang, G.Z. Mao, "Colloidal subwavelength nanostructures for anti reflection optical coatings", Opt. Lett. 30 (2005) 1885-1887.
Yakacki et al., "Shape-Memory Polymers for Biomedical Applications", Adv. Polym. Sci. 2010, 226: 147-175.
Yakacki et al., "Unconstrained recovery characterization of shape-memory polymer networks for cardiovascular applications", ScienceDirect, Biomaterials 2007, 28:2255-2263.
Yakacki, Christopher M., et al. "Impact of shape-memory programming on mechanically-driven recovery in polymers." Polymer 52.21 (2011): 4947-4954.
Yang et al., "From Metastable Colloidal Crystalline Arrays to Fast Responsive Mechanochromic Photonic Gels: An Organic Gel for Deformation-Based Display Panels", Adv. Funct. Mater. 2014, 24: 3197-3205.-1130.
Yang et al., "Macroporous photonic crystal-based vapor detectors created by doctor blade coating", Appl. Phys. Lett. 2011, 98: 1-3.
Huang, Z; et al. "Metal-Assisted chemical etching of silicon: a review" Advanced Materials 2011, 23, 285-308.
International Preliminary Report on Patentability dated May 10, 2013 for PCT Patent Application No. PCT/US2011/057484.
International Search Report and Written Opinion for PCT/US2014/063163 dated Jun. 25, 2015.
International Search Report and Written Opinion issued in PCT/US2017/046886 dated Oct. 20, 2017.
International Search Report and Written Opinion dated Jun. 26, 2012 for PCT Patent Application No. PCT/US2011/057484.
International Search Report and Written Opinion for PCT Application No. PCT/US2018/033173, dated Nov. 21, 2018.
International Search Report for International Application No. PCT/US2019/017862, dated Jan. 21, 2020.
International Search Report for PCT/US19/38193 dated Sep. 5, 2019.
International Search Report for PCT/US2018/066234 dated Mar. 25, 2019.
International Search Report for PCT/US2018/066349 dated Mar. 15, 2019.
Ionov, Leonid. "Soft microorigami: self-folding polymer films." Soft Matter 7.15 (2011): 6786-6791.
J. Aizenberg, P.V. Braun, P. Wiltzius, "Patterned Colloidal Deposition Controlled by Electrostatic and Capillary Forces", Phys. Rev. Lett. 84 (2000) 2997-3000.
Zhang et al., Fabrication and bioseparation studies of adsorptive membranes/felts made from electrospun cellulose acetate nanofibers, Journal of Membrane Science 2008, 319(1-2):176-184.
J. Tien, A. Terfort, G.M. Whitesides, "Microfabrication through Electrostatic Self-Assembly", Langmuir 13 (1997) 5349-5355.
J.-H. Kim, S. Fujita, S. Shiratori, "Design of a thin film for optical applications, consisting of high and low refractive index multilayers, fabricated by a layer-by-layer self-assembly method", Colloid Surf. Aspects 284-285 (2006) 290-294.
J.A. Hiller, J.D. Mendelsohn, M.F. Rubner, "Reversibly erasable nanoporous anti-reflection coatings from polyelectrolyte multilayers", Nat. Mater. 1 (2002) 59-63.

(56) References Cited

OTHER PUBLICATIONS

J.Q. Xi, M.F. Schubert, J.K. Kim, E.F. Schubert, M. Chen, S.-Y. Lin, LiuW, J.A. Smart, "Optical thin-film materials with low refractive index for broadband elimination of Fresnel reflection", Nat. Photon. 1 (2007) 176-179.
Jang et al., "Combining Pattern Instability and Shape-Memory Hysteresis for Phononic Switching", Nano Lett. 2009, 9, 5: 2113-2119.
Jiang et al., "Template-Directed Preparation of Macroporous Polymers with Oriented and Crystalline Arrays of Voids", J. Am. Chem. Soc. 1999, 121: 11630-11637.
Yunus, S.; et al. Diffusion of Oligomers from Polydimethylsiloxane Stamps in Microcontact Printing: Surface Analysis and Possible Application Surf. Interface Anal. 2007, 39, 922-925.
Jiang, P.; et al. Single-Crystal Colloidal Multilayers of Controlled Thickness. Chem. Mater. 1999, 11, 2132-2140.
Joannopoulos, J. D.; et al. Photonic Crystals: Molding the Flow of Light. Princeton University Press: Princeton, 1995.
K. Askar, B.M. Phillips, X. Dou, J. Lopez, C. Smith, B. Jiang, P. Jiang, "Self-assembled nanoparticle antiglare coatings", Opt. Lett. 37 (2012) 4380-4382.
K.M. Yeung, W.C. Luk, K.C. Tam, C.Y. Kwong, M.A. Tsai, H.C. Kuo, A.M.C. Ng, A.B. Djurisic, "2-Step self-assembly method to fabricate broadband omnidirectional antireflection coating in large scale", Sol Energ Mater Sol C 95 (2011) 699-703.
Kang et al., "Broad-wavelength-range chemically tunable block-copolymer photonic gels", Nature Materials 2007, 6: 957-960.
Karrock, Torben; et al. "Pressure sensor based on flexible photonic crystal membrane." Biomedical optics express 6.12 (2015): 4901-4911.
Keller, K.; et al. Inkjet Printing of Multicolor Daylight Visible Opal Holography. Adv. Funct. Mater. 2018, 28, 1706903.
Kloxin et al., "Covalent adaptable networks: smart, reconfigurable and responsive network systems", Chem. Soc. Rev. 2013, 42: 7161-7173.
Kluhr et al., Partially Oxidized Macroporous Silicon: A Three-Dimensional Photonic Matrix for Microarray Applications, Advanced Materials 2006, 18(23): 3135-3139.
Kobatake; et al. "Rapid and reversible shape changes of molecular crystals on photoirradiation" vol. 446, Apr. 12, 2007, doi: 10.1038/nature05669, pp. 1-4.
Koerner et al., "Remotely actuated polymer nanocomposites—stress-recovery of carbon-nanotube-filled thermoplastic elastomers", nature materials 2004, 3: 115-120.
Kukiattrakoon, Boonlert; et al. "Chemical durability and microhardness of dental ceramics immersed in acidic agents." Acta Odontologica Scandinavica 68.1 (2010): 1-10.
Kukiattrakoon, Boonlert; et al. "Degradability of fluorapatite-leucite ceramics in naturally acidic agents." Dental materials journal (2010): 1008310070-1008310070.
Kukiattrakoon, Boonlert; et al. "Effect of acidic agents on surface roughness of dental ceramics." Dental research journal 8.1 (2011): 6.
Kukiattrakoon, Boonlert; et al. "The effect of acidic agents on surface ion leaching and surface characteristics of dental porcelains." The journal of prosthetic dentistry 103.3 (2010): 148-162.
Kukiattrakoon, Boonlert; et al. "Vieker's microhardness and energy dispersive x-ray analysis of fluorapatite-leucite and fluorapatite ceramics cyclically immersed in acidic agents." Journal of oral science 51.3 (2009): 443-450.
Kunzelman et al., "Shape memory polymers with built-in threshold temperature sensors", Journal of Materials Chemistry 2008, 18: 1082-1086.
Kuswandi; et al., "A Simple Visual Ethanol Biosensor Based on Alcohol Oxidase Immobilized onto Polyaniline Film for Halal Verification of Fermented Beverage Samples", Feb. 2014, Sensors, 14(2):2135-2149 (Year: 2014).
Kuznetsov, A. I.; et al. Optically Resonant Dielectric Nanostructures. Science 2016, 354, 2472.

L. Ionov, "3D Microfabrication using Stimuli-Responsive Self-Folding Polymer Films", Polymer Reviews, 2013, 53: 92-107.
Lee, E.; et al. Bio-Inspired Responsive Polymer Pillar Arrays. MRS Commun. 2015, 5, 97-114.
Lee, H. S.; et al. Colloidal Photonic Crystals toward Structural Color Palettes for Security Materials. Chem. Mater. 2013, 25, 2684-2690.
Lee, J. N.; et al. Solvent Compatibility of Poly(Dimethylsiloxane)-Based Microfluidic Devices. Anal. Chem. 2003, 75, 6544-6554.
Lendlein et al., "Biodegradable, Elastic Shape-Memory Polymers for Potential Biomedical Applications", Science 2002, vol. 296: 1673-1676.
Ye et al., "Invisible Photonic Prints Shown by Deformation", Advanced Functional Materials 2014, 24: 6430-6438.
Lendlein, A.; et al. Shape-Memory Polymers. Angew. Chem. Int. Ed. 2002, 41, 2034-2057.
Leng et al., "Shape-Memory Polymers—A Class of Novel Smart Materials", MRS Bulletin 2009, 34: 848-855, www.mrs.org/bulletin.
Leng et al., "Synergic effect of carbon black and short carbon fiber on shape memory polymer actuation by electricity", Journal of Applied Physics 2008, 104: 1-4.
Leo, S. Y.; et al. Chromogenic Photonic Crystal Sensors Enabled by Multistimuli-Responsive Shape Memory Polymers Small 2018, 14, 1703515.
Li, H. L.; et al. Superoleophilic and Superhydrophobic Inverse Opals for Oil Sensors. Adv. Funct. Mater. 2008, 18, 3258-3264.
International Search Report for PCT/US2018/066353 dated Mar. 15, 2019.
Li, P.; et al. Novel Programmable Shape Memory Polystyrene Film: A Thermally Induced Beam-Power Splitter. Sci. Rep. 2017, 7, 44333.
Li, Y., et al. "Broadband near-infrared antireflection coatings fabricated by three-dimensional direct laser writing." Optics letters 43.2 (2018): 239-242.
Lishchuk, P; et al. "Photoacoustic characterization of nanowire arrays formed by metal-assisted chemical etching of crystalline silicon subsliales with different doping level" ScienceDirect 2019, 131-136.
Liu et al., "Review of progress in shape-memory polymers", J. Mater. Chem., 2007, 17: 1543-1558.
Louette, P.; et al. Poly(Dimethyl Siloxane) (Pdms) Xps Reference Core Level and Energy Loss Spectra Surf. Sci. Spectra 2006, 12, 38-43.
Lv et al., "Shape-Memory Polymer in Response to Solution", Advanced Engineering Materials 2008, 10, No. 6: 592-595.
Lv, T.;; et al. Superhydrophobic Surface with Shape Memory Micro/Nanostructure and Its Application in Rewritable Chip for Droplet Storage ACS Nano 2016, 10, 9379-9386.
M. Ibn-Elhaj, M. Schadt, "Optical polymer thin films with isotropic and anisotropic nano-corrugated surface topologies", Nature 410 (2001) 796-799.
M. Kursawe, R. Anselmann, V. Hilarius, G. Pfaff, "Nano-Particles by Wet Chemical Processing in Commercial Applicaitons", J. Sol-Gel Sci. Technol. 33 (2005) 71-74.
M. Sakhuja, J. Son, L.K. Verma, H. Yang, C.S. Bhatia, A.J. Danner, "Omnidirectional study of nanostructured glass packaging for solar modules", Prog. Photovol. 22 (2014) 356-361.
M.F. Schubert, F.W. Mont, S. Chhajed, D.J. Poxson, J.K. Kim, E.F. Schubert, "Design of multilayer antireflection coatings made from co-sputtered and low-refractive-index materials by genetic algorithm", Opt. Exp. 16 (2008) 5290-5298.
M.G. Moharam, D.A. Pommet, E.B. Grann, T.K. Gaylord, "Stable implementation of the rigorous coupled-wave analysis for surface-relief gratings: enhanced transmittance matrix approuch", J. Opt. Soc. Am. A 12 (1995) 1077-1086.
M.I. Dafinone, G. Feng, T. Brugarolas, K.E. Tettey, D. Lee, "Mechanical Reinforcement of Nanoparticle Thin Films Using Atomic Layer Deposition", ACS Nano 5 (2011) 5078-5087.
M.S. Park, J.K. Kim, "Porous Structures of Polymer Films Prepared by Spin Coating with Mixed Solvents under Humid Condition", Langmuir 22 (2006) 4594-4598.

(56) References Cited

OTHER PUBLICATIONS

Maitland et al., "Photothermal Properties of Shape Memory Polymer Micro-Actuators for Treating Stroke", Lasers in Surgery and Medicine (2002) 30:1-11.
Mao, D.; et al. Design of Nano-Opto-Mechanical Reconfigurable Photonic Integrated Circuit. J. Lightwave Technol. 2013, 31, 1660-1669.
Mason et al., "Correlation between bulk morphology and luminescence in porous silicon investigated by pore collapse resulting from drying", Thin Solid Films 2002, 406: 151-158.
Mata, A.; et al. Characterization of Polydimethylsiloxane (Pdms) Properties for Biomedical Micro/Nanosystems. Biomed. Microdevices 2005, 7, 281-293.
Mather et al., "Shape Memory Polymer Research", Annu. Rev. Mater. Res. 2009. 39: 445-471.
Yoon, B.; et al., Recent Functional Material Based Approaches to Prevent and Detect Counterfeiting. J. Mater. Chem. C 2013, 1, 2388-2403.
McDonald, J. C.; et al. Poly(Dimethylsiloxane) as a Material for Fabricating Microfluidic Devices. Acc. Chem. Res. 2002, 35, 491-499.
Meng et al., "A Brief Review of Stimulus-active Polymers Responsive to Thermal, Light, Magnetic, Electric, and Water/Solvent Stimuli", Journal of Intelligent Material Systems and Structures, vol. 21—Jun. 2010: 859-885.
Meng et al., "Various shape memory effects of stimuli-responsive shape memory polymers", Smart Materials and Structures 2013, 22: 1-23.
Meng, Y.; et al. Patterned and Iridescent Plastics with 3d Inverse Opal Structure for Anticounterfeiting of the Banknotes. Adv. Opt. Mater. 2018, 6, 1701351.
Meng, Z. P.; et al. Structurally Colored Polymer Films with Narrow Stop Band, High Angle-Dependence and Good Mechanical Robustness for Trademark Anti-Counterfeiting. Nanoscale 2018, 10, 14755-14762.
Metwalli, E., et al. "Surface characterizations of mono-, di-, and tri-aminosilane treated glass substrates." Journal of colloid and interface science 298.2 (2006): 825-831.
Metzger et al., "Mechanical Properties of Mechanical Actuator for Treating Ischemic Stroke", Biomedical Microdevices 2002, 4:2: 89-96.
Milleding, Percy, et al. "Surface energy of non-corroded and corroded dental ceramic materials before and after contact with salivary proteins." European journal of oral sciences 107.5 (1999): 384-392.
Mittleman, D. M.; et al. Optical Properties of Planar Colloidal Crystals: Dynamical Diffraction and the Scalar Wave Approximation. J. Chem. Phys. 1999, 111, 345-354.
Miyazaki, Takashi, et al. "Current status of zirconia restoration." Journal of prosthodontic research 57.4 (2013): 236-261.
Mohr, Gerhard J., Daniel Citterio, and Ursula E. Spichiger-Keller. "Development of chromogenic reactands for optical sensing of alcohols." Sensors and Actuators B: Chemical 49.3 (1998): 226-234.
Moirangthem, M.; et al. An Optical Sensor Based on a Photonic Polymer Film to Detect Calcium in Serum. Adv. Funct. Mater. 2016, 26, 1154-1160.
Moirangthem, M.; et al. Photonic Shape Memory Polymer with Stable Multiple Colors. ACS Appl. Mater. Interface 2017, 9, 32161-32167.
Munakata, et al., Three-dimensionally ordered macroporous polyimide composite membrane with controlled pore size for direct methanol fuel cells, Journal of Power Sources 2008, 178(2): 596-602.
Nam, H.; et al. Inkjet Printing Based Mono-Layered Photonic Crystal Patterning for Anti-Counterfeiting Structural Colors. Sci. Rep. 2016, 6, 30885.
Nguyen et al., "Modeling the Relaxation Mechanisms of Amorphous Shape Memory Polymers", M. L. Chambers, Adv. Mater. 2010, 22: 3411-3423.
Ogawa, Yudai, et al. "Organic transdermal iontophoresis patch with built-in biofuel cell." Advanced healthcare materials 4.4 (2015): 506-510.
Pan et al., "Response of inverse-opal hydrogels to alcohols", Journal of Materials Chemistry 2012, 22: 2018-2025.
Park, H. G.; et al. Electrically Driven Single-Cell Photonic Crystal Laser. Science 2004, 305, 1444-1447.
Park, Wounjhang; et al. "Mechanically tunable photonic crystal structure." Applied Physics Letters 85.21 (2004): 4845-4847.
Peng, C. Y.; et al. Flexible Photonic Crystal Material for Multiple Anticounterfeiting Applications. ACS Appl. Mater. Interfaces 2018, 10, 9858-9864.
Pfeiffer, Kristin, et al. "Antireflection coatings for strongly curved glass lenses by atomic layer deposition." Coatings 7.8 (2017): 118.
Pham, H. H.; et al. Multidye Nanostructured Material for Optical Data Storage and Security Data Encryption. Adv. Mater. 2004, 16, 516-520.
Phillips; et al "Biomimetic broadband antireflection gratings on solar-grade multicrystalline silicon wafers" Applied Physics Letters; Nov. 9, 2011, vol. 99, pp. 191103 (1)-(3).
Pinto, Marcelo M., et al. "Influence of pH on slow crack growth of dental porcelains." dental materials 24.6 (2008): 814-823.
Potyrailo et al., "Morpho butterfly wing scales demonstrate highly selective vapour response", Nature photonics 2007, 1: 123-128.
Preis, Verena, et al. "Wear performance of dental ceramics after grinding and polishing treatments." Journal of the mechanical behavior of biomedical materials 10 (2012): 13-22.
Quitmann et al., "Environmental Memory of Polymer Networks under Stress", Adv. Mater. 2014, 26: 3441-3444.
Raigrodski, Ariel J.; et al. "The safety and efficacy of anterior ceramic fixed partial dentures: a review of the literature." The journal of prosthetic dentistry 86.5 (2001): 520-525.
Rosenstiel, S. F., et al. "Strength of a dental glass-ceramic after surface coating." Dental Materials 9.4 (1993): 274-279.
A. Luque, S. Hegedus, Handbook of Photovoltaic Science and Engineering. John Wiley & Sons, West Sussex, 2003, 115 pages.
X. Lendlein, "Shape-Memory Polymers", Advances in Polymer Science 226, Springer, New York, NY 2010, 1-209.
H.A. Macleod, Thin-Film Optical Filters. Third ed., Institute of Physics Publishing, Bristol, 2001, 666 pages.
Gregg, S. J.; et al. Adsorption, Surface Area and Porosity. 2nd ed.; Academic Press Inc.: London, 1982.
J. D. Joannopoulos, R. D. Meade, J. N. Winn, Photonic Crystals: Molding the Flow of Light, Princeton University Press, 135 pages.
Cai, Z. Y.; et al. A Photonic Crystal Protein Hydrogel Sensor for Candida Albicans. Angew. Chem. Int. Ed. 2015, 54, 13036-13040.
Velev, O. D.; et al. Materials Fabricated by Micro- and Nanoparticle Assembly—the Challenging Path from Science to Engineering. Adv. Mater. 2009, 21, 1897-1905.
"Light" Wikipedia https://en.wikipedia.orgiwiindex.php?title=Light &oldid=797818857 (accessed Feb. 22, 2019).
"Using polyimide tape to mask against reactive-ion etching" Tech Briefs, 2002 (accessed Feb. 22, 2019).
A. Deak, B. Bancsi, A.L. Toth, A.L. Kovacs, Z. Horvolgyi, "Complex Langmuir-Blodgett films from silica nanoparticles: An optical spectroscopy study", Colloid Surf. A 278 (2006) 10-16.
A. Deak, I. Szekely, E. Kalman, Z. Keresztes, A.L. Kovacs, Z. Horvolgyi, "Nanostructured silica Langmuir-Blodgett films with antireflective properties prepared on glass substrates", Thin Solid Films 484 (2005) 310-317.
A. Gombert, B. Blasi, C. Buhler, P. Nitz, J. Mick, W. Hossfeld, M. Niggemann, "Some application cases and related manufacturing techniques for optically functional microstructures on large areas", Opt. Eng. 43 (2004) 2525-2533.
A. Gombert, W. Glaubitt, K. Rose, J. Dreibholz, B. Blasi, A. Heinzel, D. Sporn, W. Doll, V. Wittwer, "Subwavelength-structured antireflective surfaces on glass", Thin Solid Films 351 (1999) 73-78.
Zhong, K.; et al. Instantaneous, Simple, and Reversible Revealing of Invisible Patterns Encrypted in Robust Hollow Sphere Colloidal Photonic Crystals. Adv. Mater. 2018, 30, 1707246.
Zhao, Y.; et al. Bio-Inspired Variable Structural Color Materials. Chem. Soc. Rev. 2012, 41, 3297-3317.

(56) References Cited

OTHER PUBLICATIONS

Aguirre, C. I.; et al. Tunable Colors in Opals and Inverse Opal Photonic Crystals. Adv. Funct. Mater. 2010, 20, 2565-2578.
Aksoy, Gokhan, et al. "Effect of various treatment and glazing (coating) techniques on the roughness and wettability of ceramic dental restorative surfaces." Colloids and surfaces B: Biointerfaces 53.2 (2006): 254-259.
Al-Marzok, Maan; et al. "The effect of the surface roughness of porcelain on the adhesion of oral Streptococcus nutans." J Contemp Dent Pract 10.6 (2009): E017-24.
Arsenault et al., "From colour fingerprinting to the control of photoluminescence in elastic photonic crystals", nature materials 2006, 5: 179-184.
Asher et al., "Photonic Crystal Carbohydrate Sensors: Low Ionic Strength Sugar Sensing", J. Am. Chem. Soc. 2003, 125: 3322-3329.
B.-T. Liu, Y.-T. Teng, R.-H. Lee, W.-C. Liaw, C.-H. Hsieh, "Strength of the interactions between light-scattering particles and resins affects the haze of anti-glare films", Colloid Surf. A 389 (2011) 138-143.
B.E. Yoldas, D.P. Partlow, "Formation of Broad Band Antireflective Coatings on Fused Silica for High Power Laser Applications", Thin Solid Films 129 (1985) 1-14.
B.G. Prevo, E.W. Hon, O.D. Velev, "Assembly and characterization of colloid-based antireflective coatings on multicrystalline silicon solar cells", J. Mater. Chem. 17 (2007) 791-799.
B.G. Prevo, O.D. Velev, "Controlled, Rapid Deposition of Structured Coatings from Micro-and Nanoparticle Suspensions", Langmuir 20 (2004) 2099-2107.
B.T. Liu, W.D. Yeh, "Antireflective surface fabricated from colloidal silica nanoparticles", Colloid Surf. A 356 (2010) 145-149.
B.T. Liu, W.D. Yeh, "Reflective properties of nanoparticle-arrayed surfaces", Thin Solid Films 518 (2010) 6015-6021.
B.T. Liu; et al. "A novel method to control inner and outer haze of an anti-glare film by surface modification of light-scattering particles", J Colloid Interf. Sci. 350 (2010) 421-426.
Bartlett, D. W., et al. "The association of tooth wear, diet and dietary habits in adults aged 18-30 years old." Journal of dentistry 39.12 (2011): 811-816.
Behl et al., "Multifunctional Shape-Memory Polymers", Adv. Mater. 2010, 22: 3388-3410.
Bertone et al., "Thickness Dependence of the Optical Properties of Ordered Silica-Air and Air-Polymer Photonic Crystals", Physical Review Letters 1999, 83, 2: 300-303.
Boyle, B. M.; et al. Structural Color for Additive Manufacturing: 3d-Printed Photonic Crystals from Block Copolymers. ACS Nano 2017, 11, 3052-3058.
Burgess et al., "Structural colour in colourimetric sensors and indicators", Journal of Materials Chemistry C 2013, 1: 6075-6086.
Burgess, I. B.; et al. Encoding Complex Wettability Patterns in Chemically Functionalized 3d Photonic Crystals. J. Am. Chem. Soc. 2011, 133, 12430-12432.
Butler, Craig J., et al. "Effect of fluoride and 10% carbamide peroxide on the surface roughness of low-fusing and ultra low-fusing porcelain." The Journal of prosthetic dentistry 92.2 (2004): 179-183.

C. Heine, R.H. Morf, "Submicrometer gratings for solar energy applications", Appl. Opt. 34 (1995) 2476-2482.
C. Yakacki, "Shape-Memory and Shape-Changing Polymers", Polymer Reviews, 2013, 53: 1-5.
C.M. Kennemore Iii, U.J. Gibson, "Ion beam processing for coating MgF2 onto ambient temperature substrates", Appl. Opt. 23 (1984) 3608-3611.
C.S. Thompson, R.A. Fleming, M. Zou, "Solar Energy Materials & Solar Cells", Sol Energ Mater Sol C 115 (2013) 108-113.
Cansizoglu, H; et al. "Optical absorption properties of semiconducting nanostructures with different shapes" Advanced Optical Materials 2013, 1, 156-166. (Year: 2013).
Cao, Z; et al. "Study on the impact of silicon doping level on the trench profile using metal-assisted chemical etching" 2016, vol. 12,742-746.
Ccahuana, Vanessa ZS, et al. "Surface degradation of glass ceramics after exposure to acidulated phosphate fluoride." Journal of Applied Oral Science 18.2 (2010): 155-165.
Chan et al., "Mechanochromic Photonic Gels", Advanced Materials 2013, 25: 3934-3947.
Chen; et al. "Directed water shedding on high-aspect-ratio shape memory polymer micropillar arrays" Advanced Materials, 2014, pp. 1283-1288, vol. 26, doi: 10.1002/adma.201304030.
Cho, Y.; et al. Elastoplastic Inverse Opals as Power-Free Mechanochromic Sensors for Force Recording. Adv. Funct. Mater. 2015, 25, 6041-6049.
Creugers, Nico HJ; et al. "A meta-analysis of durability data on conventional fixed bridges." Community Dentistry and Oral Epidemiology 22.6 (1994): 448-452.
Cui et al., "Inverse Opal Spheres Based on Polyionic Liquids as Functional Microspheres with Tunable Optical Properties and Molecular Recognition Capabilities", Angew. Chem. Int. Ed. 2014, 53: 3844-3848.
D. Chen, "Anti-reflection (AR) coatings made by sol-gel processes: A review", Sol. Energ. Mater. Sol. C. 68 (2001) 313-336.
D. Lee, M.F. Rubner, R.E. Cohen, "All-Nanoparticle Thin-Film Coatings", Nano Lett. 6 (2006) 2305-2312.
D. Lee, Z. Gemici, M.F. Rubner, R.E. Cohen, "Multilayers of Oppositely Charged SiO2 Nanoparticles: Effect of Surface Charge on Multi9layer Assembly", Langmuir 23 (2007) 8833-8837.
D.G. Stavenga; et al. "Light on the moth-eye corneal nipple array of butterflies", Proc. R. Soc. B 273 (2006) 661-667.
Dangla, R.; et al. Microchannel Deformations Due to Solvent-Induced Pdms Swelling. Lab Chip 2010, 10, 2972-2978.
Ding et al., "Morphology and Water Vapor Permeability of Temperature-Sensitive Polyurethanes", Journal of Applied Polymer Science, (2008) vol. 107: 4061-4069.
Ding, T.; et al. Revealing Invisible Photonic Inscriptions: Images from Strain. ACS Appl. Mater. Interfaces 2015, 7, 13497-13502.
Drummond, J. L., D; et al. "Physiological aging of an all-ceramic restorative material." Dental Materials 7.2 (1991): 133-137.
Du et al., "Solvent induced shape recovery of shape memory polymer based on chemically cross-linked poly(vinyl alcohol)", Soft Matter, 2010, 6: 3370-3376.

\* cited by examiner

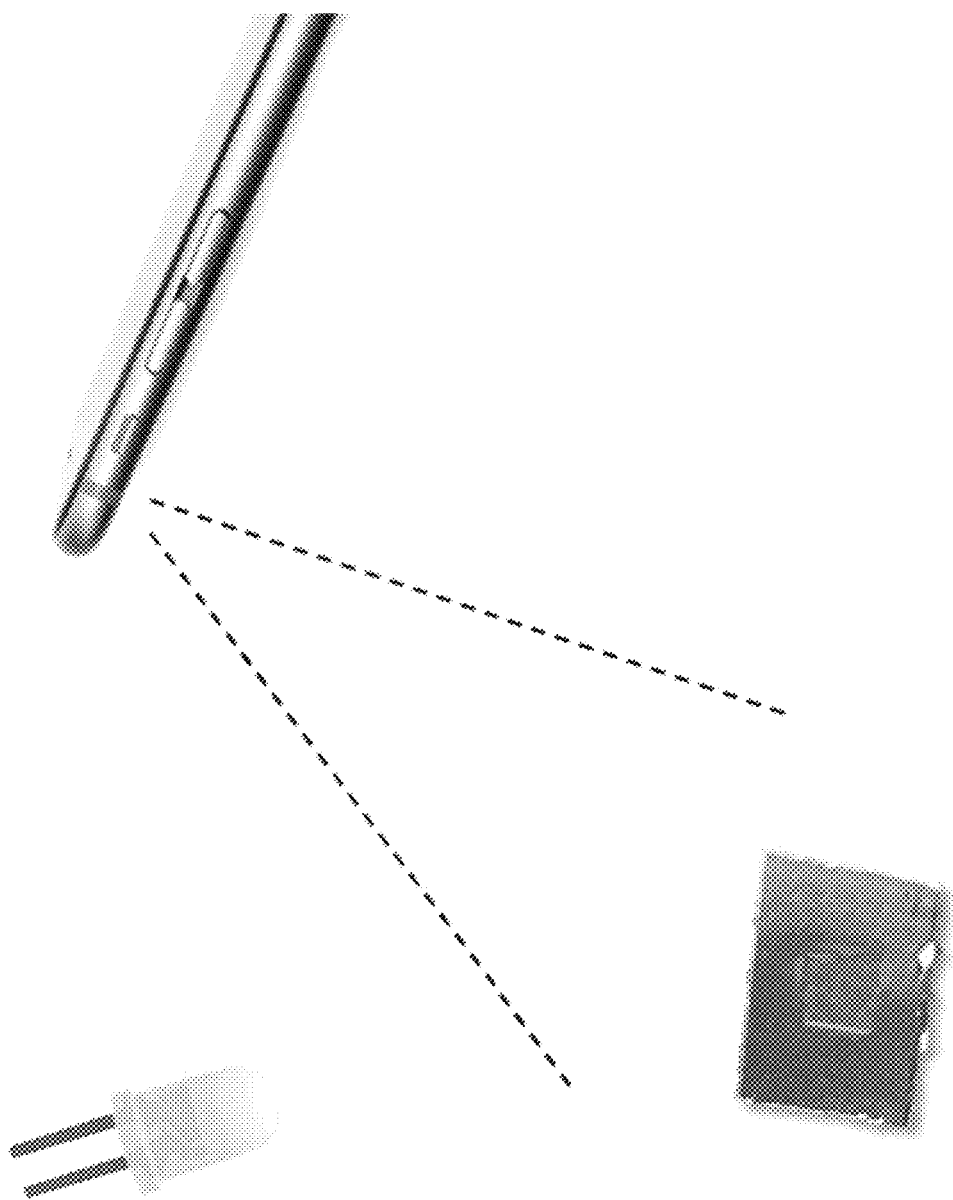

METHODS AND SENSORS FOR DETECTION

CROSS-REFERENCE TO RELATED APPLICATIONS

This application is the 35 U.S.C. § 371 national stage application of PCT Application No. PCT/US2018/066353, filed Dec. 19, 2018, where the PCT claims priority to, and the benefit of, U.S. provisional application entitled "METHODS AND SENSORS FOR DETECTION" having Ser. No. 62/607,975, filed Dec. 20, 2017, both of which are herein incorporated by reference in their entireties.

STATEMENT REGARDING FEDERALLY SPONSORED RESEARCH OR DEVELOPMENT

This invention was made with government support under HDTRA1-15-1-022 awarded by the Department of Defense/Defense Threat Reduction Agency; and under CMMI1562861 awarded by the National Science Foundation. The government has certain rights in the invention.

BACKGROUND

Chromogenic sensors can be used for sensitive and specific detection of a large variety of compounds. However, inexpensive and reliable sensors are not readily available that can be easily quantified. Thus there is a need to overcome these deficiencies.

SUMMARY

Embodiments of the present disclosure provide sensors, methods of use, kits including sensors, and the like.

An embodiment of the present disclosure includes methods of measuring the presence of a first liquid in a liquid mixture. The method includes providing a shape memory polymer substrate having a polymer structure in a programmed state. The polymer structure has a waveform cross-section. The wave can be a square waveform cross-section, a rectangle waveform cross-section, a sine wave waveform cross-section, a triangular waveform cross-section, a sawtooth waveform cross-section, a pyramidal waveform cross-section, or a combination thereof. The method also includes exposing an area of the polymer structure in a programmed state to a liquid mixture. The area of the polymer structure in the programmed state changes to polymer structure in an activated state when exposed to the liquid mixture including the first liquid.

An embodiment of the present disclosure includes chromogenic sensors. The sensors can include a polymer structure in a programmed state. The polymer structure can have a waveform cross-section such as a square waveform cross-section, a rectangle waveform cross-section, a sine wave waveform cross-section, a triangular waveform cross-section, a sawtooth waveform cross-section, a pyramidal waveform cross-section, or a combination thereof. Upon exposure to a first liquid, the polymer structure in the programmed state changes to polymer structure in an activated state.

An embodiment of the present disclosure includes a kit for testing the presence of a first liquid, comprising using the sensors described above and instructions for use of the chromogenic sensor to test for the presence of the first liquid in a liquid mixture.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 4 is a schematic illustration of an embodiment of colorimetric detection with a smartphone.

Figure 1A:
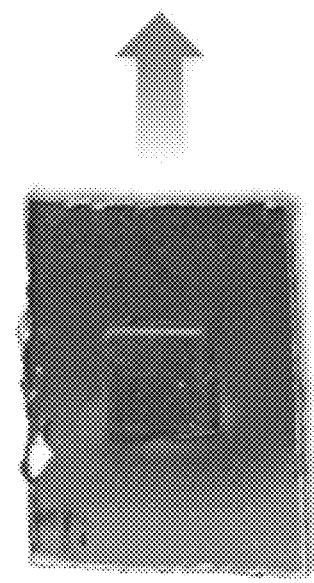
FIGS. 1A-1C are photographs of examples of a shape memory polymer sensor first deformed, then tested on TruFuel®, then Shell RON 93 gasoline.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for methods of detecting, sensors (e.g., chromogenic sensor), kits, compositions, and the like that related to or use shape memory polymer substrate including a polymer structure. In an aspect, a change of state of the polymer structure as described herein can be used to determine the presence of a certain type(s) of liquid (e.g., ethanol) in a liquid mixture (e.g., gasoline). Embodiments of the present disclosure are scalable in manufacturing, simple to use, provides robust results, and re-useable while also being inexpensive.

In an aspect, the present disclosure includes a method of measuring the presence of a first liquid (or multiple different types of liquids) in a liquid mixture. The liquid mixture (e.g., an aqueous or non-aqueous mixture) can optionally include a first liquid (e.g., an organic solvent such as ethanol). The shape memory polymer substrate (e.g., polymer structure and optionally support structures to hold the polymer structure) can be exposed to the liquid mixture, where the exposure can be direct contact with the liquid mixture or indirectly with the vapor from the liquid mixture. In an aspect, the shape memory polymer substrate or a portion thereof can be dipped into the liquid mixture. In another aspect, an amount (e.g., a drop or larger amount) of the liquid mixture can be disposed onto the surface of the shape memory polymer substrate and contacts the polymer structure. In an aspect, an area of the shape memory polymer substrate can be exposed to the vapor of the liquid mixture and detected indirectly.

It should be noted that in some instances it may be stated that "shape memory polymer substrate is exposed to liquid . . . " or "shape memory polymer substrate state change . . . " or similar statement, but this includes the "polymer structure" since the polymer structure is activated to produce the color change.

Upon exposure of the polymer structure of the shape memory polymer substrate to the liquid mixture, the polymer structure changes state (e.g., from a programmed state to an activated state). The change of state also causes a change in color (e.g., from a first color to a second color), for example from a transparent appearance to an iridescent green or in other instance to blue. The color and color change can be tuned based on the composition of the shape memory polymer substrate and/or the method of making the shape memory polymer substrate. In an aspect, the color change is perceptible by the human eye, while in another aspect the first color and the second color can be evaluated using a device (e.g., image capture device, colorimeter, or the like) to measure the first color and/or the second color. Optionally, the device can correlate the color change or the first color and/or the second color using a known standard to the identity the color (e.g., color change, first color, and/or second color) of the first liquid. In an aspect, the device can include a portable or handheld mobile device such as, e.g., smartphone, digital camera, tablet, laptop, and the like. Images can also be taken on one image capture device and provided to an application on a second device. In an embodiment, the shape memory polymer substrate can be used in a chromogenic sensor and kit to determine the presence of a first fluid in the liquid mixture (e.g., the liquid form, the vapor form, or both). For example, the method, chromogenic sensor, or kit can be useful for detecting the presence or concentration of a component in fuel. In an embodiment, the first liquid can be an organic solvent that can interact with the polymer such as an alcohol (e.g., ethanol) and the liquid mixture can be an aqueous mixture or a non-aqueous mixture such as a hydrocarbon mixture like gasoline. In this regard, the method, chromogenic sensor, or kit of the present disclosure can be used to determine the presence of (e.g., or presence above a certain concentration level) of ethanol in the gasoline, which can be useful in situations that require low or zero ethanol in the gasoline, such as in aircraft fuel.

In regard to the kit, the kit would have instructions and optionally a wipe(s) to clean off the surface of the shape memory polymer substrate, gloves, a device to expose the liquid mixture to the shape memory polymer substrate, and the like. The instructions would, among other things, provide guidance on how to perform the test, evaluate the test (e.g., guide for what the color change means (e.g., presence of a first liquid or the like), clean the shape memory polymer substrate, use the analysis system (e.g., use the mobile device, the webpage to evaluate the results, and the like). The instructions may include other guidance as well to evaluate the contents of the liquid mixture in question.

In an aspect, the polymer structure of the shape memory polymer substrate (e.g., as included in a chromogenic sensor or similar sensor) is in a programmed state. In an aspect, the shape memory polymer substrate can optionally include one or more substrates to support the polymer structure. In an embodiment, the shape memory polymer substrate can include two substrates (e.g., at one is transparent and can be made of glass, plastic, or the like) on either side of the polymer substrate.

In an embodiment, the polymer substrate has a waveform cross-section. The waveform cross-section is perpendicular to the plane of the substrate, for example the ridges of a CD or DVD are perpendicular to the plane of the CD or DVD. In an embodiment, the polymer structure can have a ridged structure (e.g., such as a DVD or CD) with peaks and valleys corresponding to the waveform. In an embodiment, the waveform cross-section can be a square (or substantially square) waveform cross-section, a rectangle waveform cross-section, a sine wave waveform cross-section, a triangular waveform cross-section, a sawtooth waveform cross-section, a pyramidal waveform cross-section, and a combination thereof. In an aspect, the waveform cross-section is similar to that of a DVD or CD. One or more of the dimensions of the peaks and valleys can be about 10 nm to 10 cm or about 0.1 mm to 1 cm, depending upon the particular application, and in an embodiment are within the standard dimensions of a DVD or CD. In the programmed state, one or more dimensions of the waveform of the polymer structure will be different than one or more dimensions of the waveform of the polymer structure in the activated state. The change in the one or more dimensions results in each state having a first color and second color, respectively the programmed state and the activated state.

As mentioned above, the polymer structure has a starting state, a programmed state, and an activated state. In the starting state, the polymer structure has a starting set of dimensions, while in the programmed state the polymer structure has a program set of dimensions. In the activated state, the polymer structure has an activated set of dimensions. In an embodiment, the starting state has one or more dimensions that is greater than the programmed state, while the programmed state has one or more dimensions that is less than that of the activated state.

In an aspect, the polymer structure in the programmed state will convert to the polymer structure in the activated state when an activation condition is applied to the polymer structure in the programmed state. In an embodiment, the activation condition can be exposure to a first liquid (e.g., an alcohol such as ethanol) in a liquid mixture. The polymer structure in the programmed state can be exposed to the first liquid and transition into the polymer structure in the activated state.

In an embodiment, the polymer structure can be made by heating polymer structure in the starting state to a programming temperature under a first pressure and/or temperature to form the polymer structure in the programmed state. Subsequently, the polymer structure in the programmed state is cooled under the first pressure to a cooling temperature (ambient temperature of about 0 to 40° C.), where the polymer structure remains in the programmed state after cooling. In other words, the programming temperature is greater than the transition temperature of the polymer, and since the molecular chains of the polymer are flexible, the polymer compresses under the first pressure. During the cooling process under the first pressure, the molecular chains of the polymer lock into place, so that when the first pressure is released, the shape memory polymer stays in the programmed state. Exposing the polymer structure in the programmed state to the first liquid allows the locked molecular chains to release and convert to the activated state having one or more greater dimensions than in the programmed state.

In an aspect and as stated briefly above, the polymer structure in the programmed state has a first color and the polymer structure in the activated state has a second color, where the first color and the second color are distinguishable. In an aspect, the first color and the second color are distinguishable using the naked eye for a majority of individuals without color vision deficiencies for the first color and the second color. In an aspect, the first color and/or the second color can be measured colorimetrically with a device such as a smart phone or other device that can capture a picture of the polymer structure or a device that can measure the color such as a colorimeter. In an aspect, the change in color or the difference in the first and the second color can be used to determine the presence of a first liquid in a liquid mixture. For example, the polymer structure in the programmed state can be exposed to the liquid mixture and if present, the polymer structure in the programmed state changes to the polymer structure in the activated state. The second color can be measured, and if present, indicates that the liquid mixture includes the first liquid. Alternatively, the first color can be measured prior to exposure to the liquid mixture and then the color of the polymer structure can be measured after exposure, and if the second color is measured (by comparison with the first color) then the first liquid is present in the liquid mixture. If not change in color is measured, then the first liquid is not present in the liquid mixture.

The methods and compositions described herein can use a large variety of shape memory polymers to form the polymer structure of the shape memory polymer substrate depending on the desired configuration of the tunable polymer membrane. In an embodiment, the polymer structure comprises a polymer such as a thermoplastic shape memory polymer can be a thermoplastic shape memory polymer and/or a thermosetting shape memory polymer. In an embodiment, the polymer structure comprises a polymer such as a thermoplastic shape memory polymer can be a thermoplastic shape memory polymer and/or a thermosetting shape memory polymer. In an embodiment, the thermoplastic shape memory polymer can be selected for instance from organic thermoplastic polymer such as: polyurethane, polyaryletherketone (PAEK), polyether ether ketone (PEEK), polypropylene (PP), polystyrene, polynorbornene, polyester, polyether, polyethylene terephthalate (PET), polyethyleneoxide (PEO), poly(methyl mathacrylate) (PMMA), epoxy, and a combination thereof.

In an aspect, the shape memory polymers of the polymer structure can be described herein can be elastic or glassy. A "glassy" polymer can be a polymer or copolymer with glass transition temperature higher than room temperature. A "glassy" polymer can be optically transparent. A glassy polymer as used herein can have a glass transition state ($T_g$) higher than room temperature. In an embodiment, a glassy polymer has a $T_g$ of about 120° C. In an embodiment, the glassy polymer is poly(urethane) (with a typical $T_g$ of about 90° C.), polyethylene terephthalate (PET) and polyethyleneoxide (PEO), block copolymers containing polystyrene and poly(1,4-butadiene), and poly(2-methyl-2-oxazoline) and polytetrahydrofuran, polynorbornene, epoxy, and other types of shape memory polymers.

As described generally above, aspects of the present disclosure provide for methods of measuring the presence of a first liquid in a liquid mixture. In an aspect, a method can include using a polymer structure in a programmed state, where the polymer structure has a waveform cross-section selected from the group consisting of: a square (or substantially square) waveform cross-section, a rectangle waveform cross-section, a sine wave waveform cross-section, a triangular waveform cross-section, a sawtooth waveform cross-section, a pyramidal waveform cross-section, and a combination thereof. The polymer structure can be exposed to a liquid mixture that may include the first fluid. An area of the polymer structure in the programmed state will change to a polymer structure in an activated state when exposed to the liquid mixture that includes the first liquid or remain unchanged if the first fluid is not present. The polymer structure in the programmed state has a first color and the polymer structure in the activated state has a second color, where the first color and the second color are distinguishable. Thus, when the first liquid is present in the liquid mixture, the polymer structure will be in the activated state and have the second color. The first color and/or second color can be measured using colorimetrically using a device such as a smart phone or colorimeter. In an embodiment where a device capable of obtaining a digital image is used, a digital picture of the shape memory polymer substrate in the activated state (and/or optionally in the programmed state prior to exposure to the liquid mixture) can be examined to determine the RGB values of the polymer structure and if the RGB value is within a pre-determined range and/or distinguishable from the RGB value of the polymer structure in the programmed state, it can be determined that the first liquid is present in the liquid mixture. Although the RGB color index is used in an embodiment, other color indexes (e.g. hex, CYMK, Pantone) can be used to determine if the first color and the second color are distinguishable and/or if the second color is within a value range to confirm the polymer structure is in the activated state.

In an aspect, the polymer structure of the shape memory polymer substrate can be made by disposing precursor materials (e.g., a monomer, a monomer composition, or a polymer) used to form the polymer of the polymer structure in a mold to produce the desired waveform cross-section. After monomers are placed in the space, they can be polymerized by a polymerization method to form the polymer structure. In an aspect, the polymerization method can be photo-polymerization, wherein the monomers are polymerized by the application of light. In an embodiment, the light can be UV light and can be applied for a period of time. One or more other polymerization methods, such as thermal polymerization, can be used and the appropriate components (e.g., initiators and the like) can be included with the precursor materials to cause the polymerization.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Polymer-based chromogenic sensors can be an inexpensive and reliable tool for sensitive and specific detection of a large variety of analytes. However, it is hard to quantify with the naked eye. Smartphones offer a unique resource as an imaging, analysis, storage, and transmission of results. Hence, the present disclosure describes an alternative-inexpensive and reliable chromogenic sensors by integrating new shape memory polymers with periodic grating structures templated from optical discs, such as DVDs. These novel sensors can be easily implemented with mobile smartphone platforms for quantitative analysis.

A templating method for replicating the DVD grating structure with shape memory polymers was employed in fabricating the chromogenic sensors. The polyurethane monomer and photoinitiator mixture was first heated up to 80° C. and then poured onto the DVD grating, which was washed thoroughly with ethanol three times. After that, the mixture was allowed to cool down to room temperature. It was then polymerized with a transilluminator for 90 min. Finally, the polyurethane was removed from the DVD grating. To deform the templated SMP sensor, the sample was placed in between a pre-cleaned glass substrate and a smaller glass piece. The sample was then held by two stainless steel plates, and a clamp force of 120 lb was applied using a manual hydraulic press (Carver Model C). The temperature of the system rapidly was increased from room temperature to ~95° C. and held at this temperature for 5 min. The sample then cooled down to room temperature. After releasing the clamp force, the pressed region became nearly transparent as shown in FIG. 4. During the above heating process, the polymer became soft and flexible. The applied clamp force was sufficient to deform the templated nanostructures into featureless film. During cooling, the polymer underwent a rubbery-to-glassy state transition and the temporary, featureless state was programmed into the polymer.

This simple setup comprises a smartphone as a photodetector, a light source from the phone, and the sensor (FIG. 4). A homemade frame was used to mount the phone to control its relative position to the sensor and the camera's light collection angle (~45° from the normal of the sensor surface). A digital image of the sample was then captured, and the RGB values corresponding to a cropped circular area (radius ~3 mm) were analyzed using the free Color Mate Version 1.2.2 app. In other embodiments, the light source could be separate from the smartphone/photodetector.

Figure 1B:
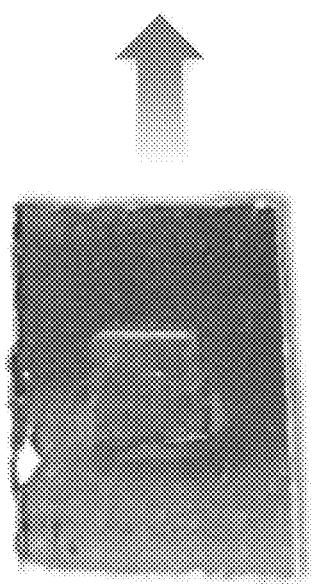
Figure 1C:
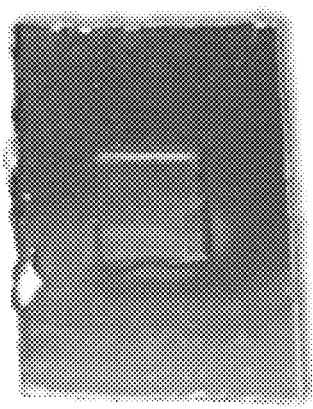
Figure 1D:
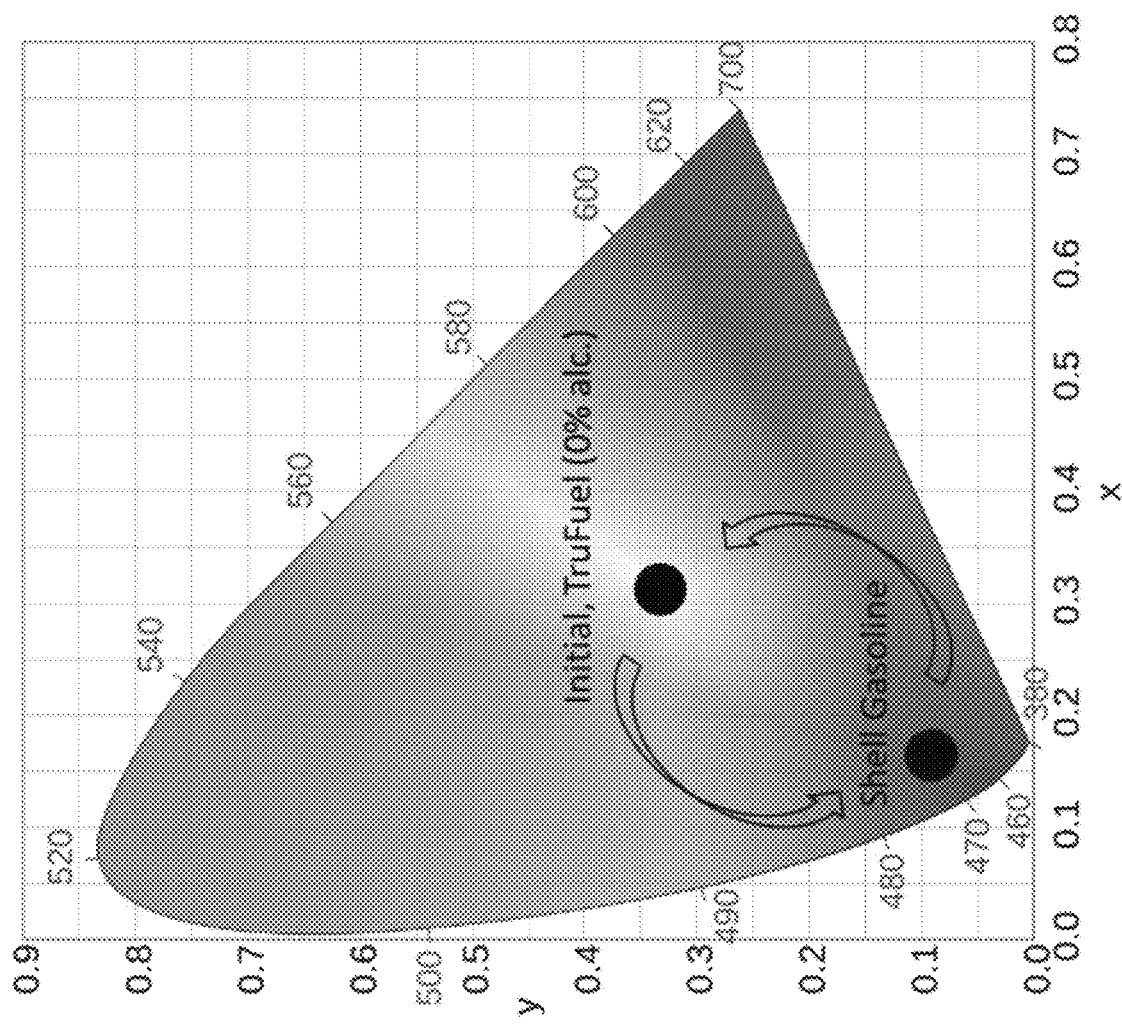
FIG. 1D illustrates the color change of the sensor with CIE 1931 color space (set point 0.33, 0.33 as initial).

The chromogenic sensors were tested using commercial ethanol-free TruFuel and RON (Research Octane Number) 93 gasoline. FIG. 1A shows the initial, as-prepared sample that was first deformed by placing a nearly square-shaped glass piece on the templated polymer sample, which was supported by a glass substrate. A clamp force of 120 lb was then applied on the glass-polymer-glass sandwich structure through the hydraulic press at ~95° C. After 5 min, the sample was cooled to room temperature. The deformed square-shaped area changed from iridescent to transparent. No apparent changes occurred for the programmed samples in TruFuel®, which contains no ethanol at all, for more than 5 minutes (FIG. 1B). The striking color changes of the sensor occured when dipped into the Shell RON 93 gasoline, (FIG. 1C) shown after 5 seconds. This experiment proves that the sensor described herein could easily distinguish ethanol-free gasoline from regular gasoline-ethanol blends by simply dipping the sensor into the liquid for a short period of time.

Figure 2A:
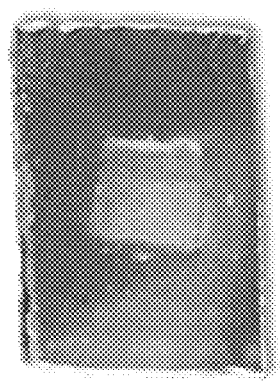
FIGS. 2A-2C are photographs of examples of a shape memory polymer sensor first deformed, then tested on alcohol-free Listerine®, then regular Listerine®.
Figure 2B:
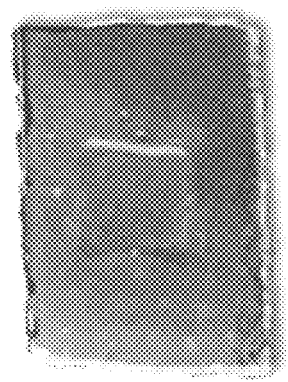
Figure 2C:
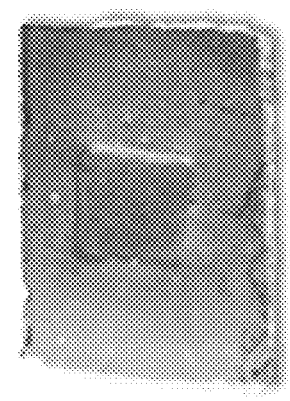
Figure 2D:
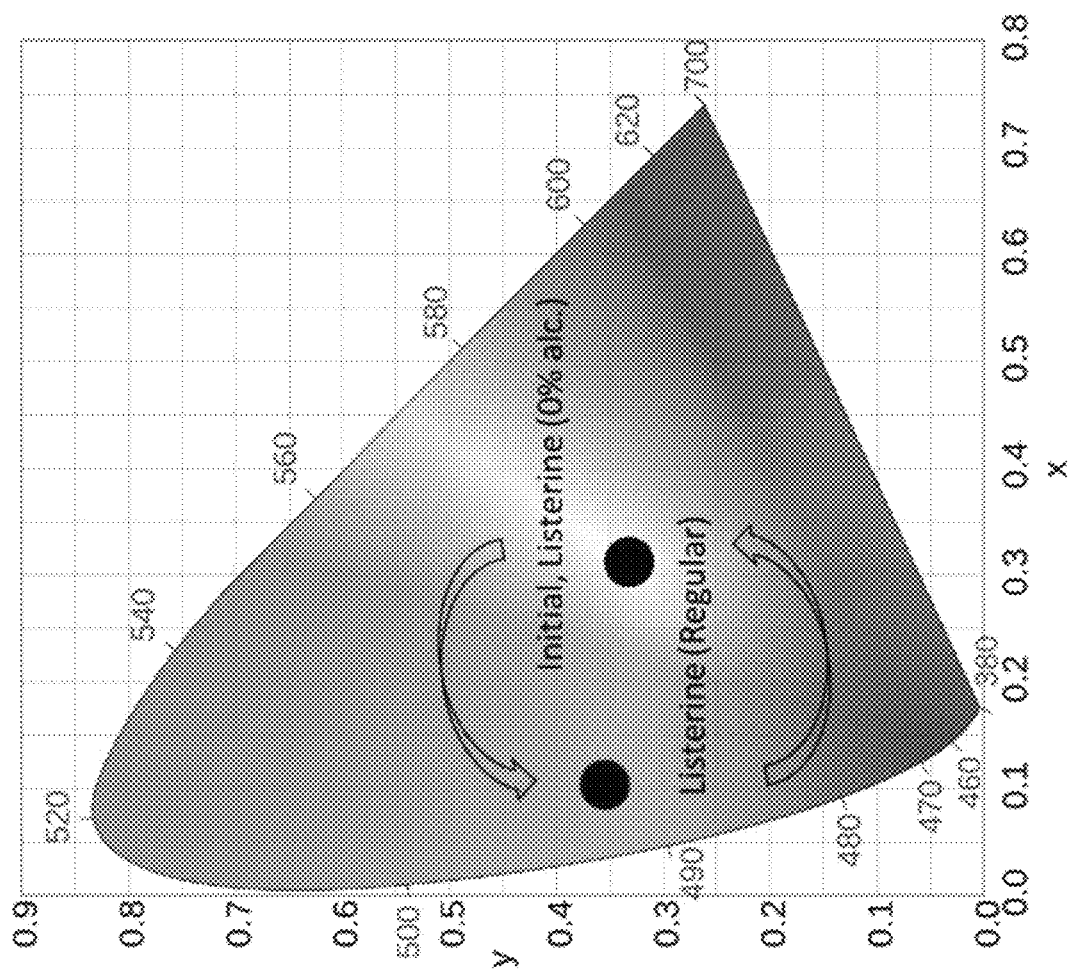
FIG. 2D illustrates the color change of the sensor with CIE 1931 color space (set point 0.33, 0.33 as initial).

Again, while sensing ethanol in gasoline demonstrated the capability of using the smartphone as well as the sensor, a critical challenge was taking the same concept to test for ethanol in other commercial consumer products. FIG. 2A shows the initial, as-prepared sample that was first deformed using the same method as FIG. 1A. There are no apparent changes for the programmed samples immersed in alcohol-free Listerine® antiseptic mouthwash (FIG. 2B). Next, the sample was dipped into regular Listerine® antiseptics for 5 s and it shows apparent chromogenic effects (FIG. 2C). Although, traditional lab-based spectroscopy-based analysis might be more accurate, our low cost sensor setup offers a convenient and inexpensive solution for a large number of customers to use at home by themselves.

Figure 3C:
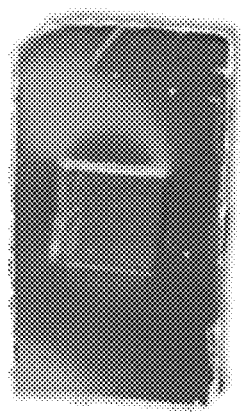
FIGS. 3A-3C are photographs of examples of a shape memory polymer sensor first deformed, then tested on ethanol-free NyQuil™, then regular NyQuil™.
Figure 3B:
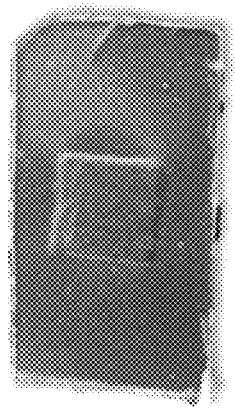
Figure 3A:
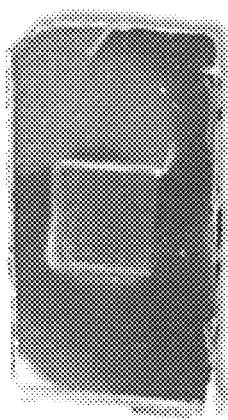
Figure 3D:
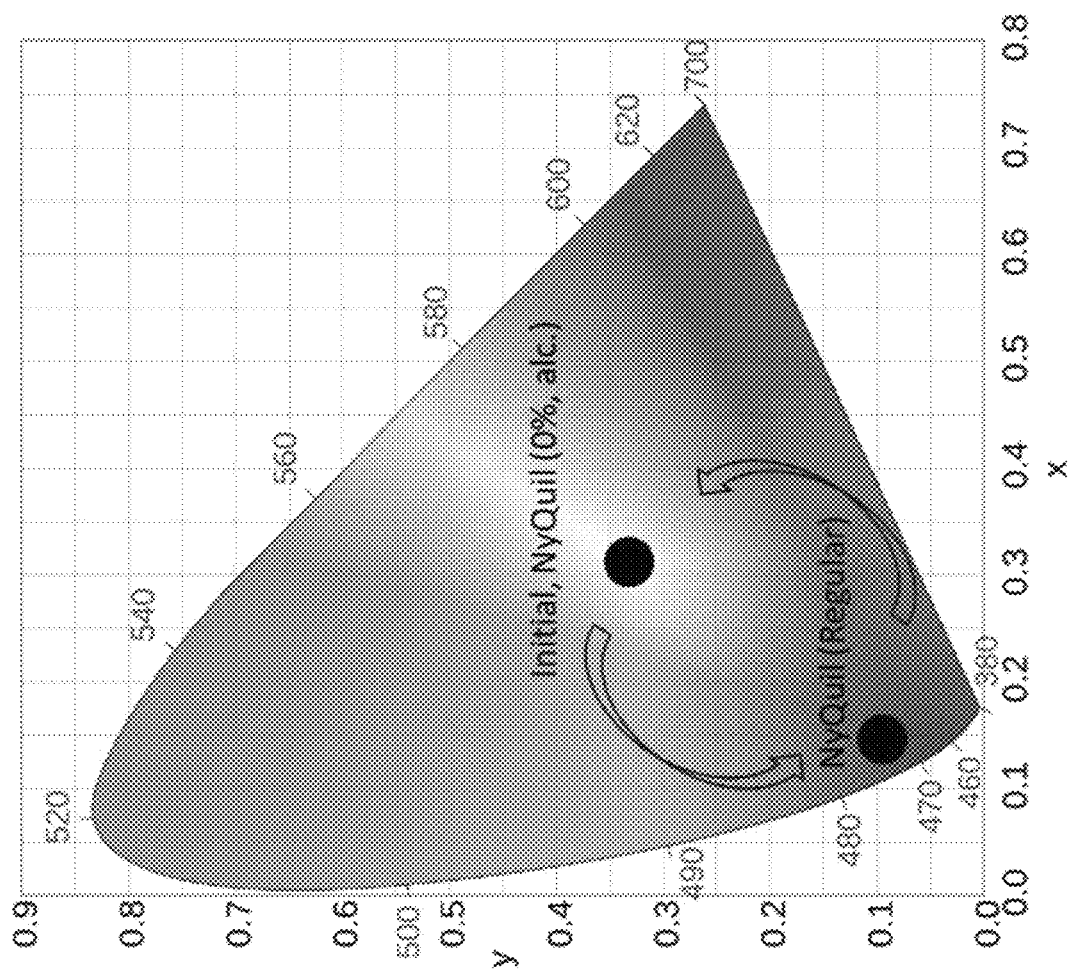
FIG. 3D illustrates color change of the sensor with CIE 1931 color space (set point 0.33, 0.33 as initial).

The sensor was also used to distinguish ethanol-free (FIG. 3B) and regular NyQuil™ Cold & Flu (FIG. 3C) medicine. The results obtained, shown in FIGS. 3A-3D, were similar to those in the fuel and mouthwash experiments, indicating that the sensor can detect ethanol in multiple types of consumer products.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method of indicating a presence of a first liquid in a liquid mixture, comprising:
   providing a chromogenic sensor comprising a shape memory polymer structure in a programmed state, wherein the shape memory polymer structure has a waveform cross-section selected from the group consisting of: a square waveform cross-section, a rectangle waveform cross-section, a sine wave waveform cross-section, a triangular waveform cross-section, a sawtooth waveform cross-section, a pyramidal waveform cross-section, and a combination thereof; and
   exposing an area of the shape memory polymer structure in a programmed state to a liquid mixture, wherein the area of the shape memory polymer structure in the programmed state changes the shape memory polymer structure to an activated state when exposed to the liquid mixture including the first liquid;
   wherein one or more dimensions of the waveform cross-section in the programmed state is different than one or more dimensions in the activated state, and wherein a change in the one or more dimensions results in the programmed state having a first color and the shape memory polymer structure in the activated state having a second color; and
   wherein the presence of the first liquid is indicated by the change to the activated state when the first liquid is present above a pre-determined concentration.

2. The method of claim 1, wherein the color change between the first color and the second color is perceptible to the human eye.

3. The method of claim 1, wherein the indicating includes measuring the second color colorimetrically with a device.

4. The method of claim 3, wherein the device is a portable electronic device.

5. The method of claim 4, wherein the portable electronic device is a phone, tablet, or portable computer.

6. The method of claim 3, wherein measuring includes obtaining a digital picture of the polymer structure in the activated state and determining the RGB values of the polymer structure, wherein if the RGB value is within a pre-determined range, the first liquid is present.

7. The method of claim 1, further comprising measuring the first color and the second color colorimetrically with a device.

8. The method of claim 7, wherein the device is a phone, tablet, or portable computer.

9. The method of claim 7, wherein the measuring includes obtaining a digital picture of the shape memory polymer structure in the programmed state and the activated state; determining the RGB values of the shape memory polymer structure in each of the programmed state and the activated state; and determining if the RGB values are different or the same, wherein if they are different then the first liquid is present.

10. The method of claim 1, wherein the first liquid is ethanol.

11. The method of claim 10, wherein the liquid mixture is gasoline.

* * * * *